United States Patent
Förster et al.

(10) Patent No.: US 10,143,962 B2
(45) Date of Patent: Dec. 4, 2018

(54) REFRIGERANT DRYER, IN PARTICULAR COMPRESSED AIR REFRIGERANT DRYER, AND HEAT EXCHANGER FOR A REFRIGERANT DRYER, IN PARTICULAR A COMPRESSED AIR REFRIGERANT DRYER

(75) Inventors: Andreas Förster, Dörfles-Esbach (DE); Andreas Fredenhagen, Coburg (DE); Michael Feisthauer, Meeder (DE); Andreas Walter, Buhl (DE); Kristian Dering, Coburg (DE)

(73) Assignee: KAESER KOMPRESSOREN SE, Coburg (DE)

(*) Notice: Subject to any disclaimer, the term of this patent is extended or adjusted under 35 U.S.C. 154(b) by 1086 days.

(21) Appl. No.: 13/641,254

(22) PCT Filed: Apr. 12, 2011

(86) PCT No.: PCT/EP2011/055672
§ 371 (c)(1),
(2), (4) Date: Oct. 15, 2012

(87) PCT Pub. No.: WO2011/128317
PCT Pub. Date: Oct. 20, 2011

(65) Prior Publication Data
US 2013/0032315 A1  Feb. 7, 2013

(30) Foreign Application Priority Data
Apr. 14, 2010 (EP) .................... 10159958

(51) Int. Cl.
*B01D 53/26* (2006.01)
*F28D 7/00* (2006.01)
(Continued)

(52) U.S. Cl.
CPC ......... *B01D 53/265* (2013.01); *F28D 7/0008* (2013.01); *F28D 9/0093* (2013.01);
(Continued)

(58) Field of Classification Search
CPC ...... F24F 3/1405; F24F 3/1429; F24F 5/0017; F24F 5/0021; F24F 5/0035; F28D 20/02;
(Continued)

(56) References Cited

U.S. PATENT DOCUMENTS 2,241,411 A * 5/1941 McGuffey ............... F25B 39/02
                                                                                165/10
2,416,015 A * 2/1947 McGuffey ............... F25D 3/005
                                                                                126/400
(Continued)

FOREIGN PATENT DOCUMENTS

DE       3428335       2/1986
DE       10030627      1/2002
(Continued)

OTHER PUBLICATIONS

"PCT International Search Report and Written Opinion", from International Application No. PCT/EP2011/055672, dated Apr. 12, 2011, pp. 1-12.

(Continued)

*Primary Examiner* — David Teitelbaum
*Assistant Examiner* — For K Ling
(74) *Attorney, Agent, or Firm* — Abel Law Group, LLP (57) ABSTRACT

The invention relates to a heat exchanger for a refrigerant dryer such as a compressed air refrigerant dryer comprising at least one first inflow surface element, past which a fluid to be dried such as compressed air can flow during operation of the heat exchanger, and comprising at least one second inflow surface element, past which a refrigerant fluid can flow as required during operation of the heat exchanger, wherein the first and second inflow surface elements are or can be coupled at least in some areas to at least one cold store chamber that is provided for filling with a cold accumulator medium, and wherein the first and/or second inflow (Continued)

surface element(s) (is) are connected to at least one heat transfer element which extends into the cold store chamber, e.g. penetrates the cold store chamber.

22 Claims, 8 Drawing Sheets

(51) Int. Cl.
  *F28D 9/00* (2006.01)
  *F28D 20/02* (2006.01)
  *F28F 3/02* (2006.01)
  *F28D 21/00* (2006.01)

(52) U.S. Cl.
  CPC .............. *F28D 20/02* (2013.01); *F28F 3/027* (2013.01); *F28D 2021/0038* (2013.01); *Y02E 60/145* (2013.01)

(58) Field of Classification Search
  CPC .... F28D 20/021; F28D 20/025; F28D 20/026; F28D 2020/0013; F28D 15/0233; F25B 39/022; F25B 39/024; B01D 53/265
  USPC .......... 165/10, 104.14, 110, 140; 62/92, 93, 62/272, 332, 406, 430–439
  See application file for complete search history.

(56) References Cited

U.S. PATENT DOCUMENTS

| | | | | |
|---|---|---|---|---|
| 2,814,186 | A * | 11/1957 | Kleist | F25D 3/005 165/137 |
| 5,228,504 | A | 7/1993 | Mantegazza et al. | |
| 5,275,233 | A * | 1/1994 | Little | 165/111 |
| 5,299,633 | A * | 4/1994 | Bruggemann et al. | 165/113 |
| 5,816,320 | A * | 10/1998 | Arnold | F28D 1/0535 165/152 |
| 6,085,529 | A * | 7/2000 | Galus et al. | 62/93 |
| 6,311,502 | B1 | 11/2001 | Trombin et al. | |
| 6,393,861 | B1 * | 5/2002 | Levenduski et al. | 62/434 |
| 6,415,855 | B2 * | 7/2002 | Gerard et al. | 165/166 |
| 6,729,389 | B2 | 5/2004 | Ohashi | |
| 6,854,513 | B2 * | 2/2005 | Shirota et al. | 165/203 |
| 7,134,483 | B2 * | 11/2006 | Barnwell | 165/11.1 |
| 7,147,047 | B2 * | 12/2006 | Wolk | 165/152 |
| 7,213,402 | B2 * | 5/2007 | Bellemo | 62/93 |
| 7,219,719 | B2 * | 5/2007 | Gerard | 165/166 |
| 7,762,090 | B2 * | 7/2010 | Lee | 62/93 |
| 7,789,128 | B2 * | 9/2010 | Rehberg | 165/166 |
| 2007/0137843 | A1 | 6/2007 | Gievers | |
| 2010/0018231 | A1 * | 1/2010 | Haller | F28D 1/0535 62/238.6 |
| 2011/0179807 | A1 * | 7/2011 | Holloway et al. | 62/3.62 |

FOREIGN PATENT DOCUMENTS

| | | |
|---|---|---|
| EP | 0179987 | 5/1985 |
| EP | 1081445 | 7/2001 |
| EP | 2108910 | 10/2009 |
| EP | 2169339 | 3/2010 |
| WO | WO-0117665 | 3/2001 |
| WO | WO-2004081478 | 9/2004 |
| WO | WO-2011128317 | 10/2011 |

OTHER PUBLICATIONS

"International Preliminary Report on Patentability", from International Application No. PCT/EP2011/055672, dated Oct. 16, 2012 (9 pages).

Examination Notification Article 94(3) EPC, for European Patent Application No. 101599587 dated Sep. 25, 2014 (6 pages).

"Office Action", for Chinese Patent Application No. 201180019149.9, dated May 12, 2014 (8 pages) with translation.

"Third Party Observation", for European Patent Application No. 20100159958, dated May 14, 2014 (3 pages).

\* cited by examiner

REFRIGERANT DRYER, IN PARTICULAR COMPRESSED AIR REFRIGERANT DRYER, AND HEAT EXCHANGER FOR A REFRIGERANT DRYER, IN PARTICULAR A COMPRESSED AIR REFRIGERANT DRYER

BACKGROUND

When (compressed) gases such as compressed air are being employed, it is often required or at least desirable to remove condensable components from the gas. A method for this purpose known in the prior art is so-called refrigerant drying, i.e. the cooling of the gas to a lower temperature using refrigerant circulation and precipitating the condensed components. In this case, an additional counter-flow heat exchanger is provided by means of which the entering gas to be dried can be cooled by the cold exiting gas so that the required cooling capacity, on the one hand, and the relative moisture of the exiting gas, on the other, can be reduced.

Due to external conditions such as different temperatures of use and/or different incoming volume flows, a cooling capacity necessary for the cooling is often subjected to strong fluctuations. The cooling capacity needs to be adapted to such fluctuations, since too strong a cooling can lead to a solidification of the condensable components which can result in the plugging and/or damaging of the heat exchanger.

In terms of control technology, the capacity can be adapted by switching off a refrigerant compressor at a lower temperature limit and switching it on again at an upper temperature limit and/or after a determined time (ON/OFF control). With such a method, however, comparably larger fluctuations in the cooled air temperature curve and hence comparably larger fluctuations in the achievable pressure dew point will still arise.

An ON/OFF control with comparably low pressure dew point fluctuations is described in the prior art, namely EP 0 405 613 B1. In this case, the cooling capacity generated in excess when the refrigerant is circulated is effectively stored and output again to the gas to be cooled when refrigerant circulation is at standstill. The heat exchanger known in the prior art comprises quartz sand as the thermal mass between the refrigerant fluid and the air flow to be dried. The known heat exchanger enables operation at comparably low pressure dew point fluctuations but requires a considerable structural volume so as to realize the required exchange surfaces. Associated hereto is a high material expenditure of comparably expensive materials as well as a high weight of the heat exchanger and the accumulator material. Due to this, the dryer is relatively expensive, heavy and needs a larger floor space than a standard dryer.

DE 199 43 109 C1 proposes another solution with respect to the problem of pressure dew point fluctuations. According to DE 199 43 109 C1, a "standard heat exchanger" is proposed in conjunction with a circulating refrigerant fluid which is in turn cooled by refrigerant circulation. An ice-water mixture is generated by the refrigerant circuit. Storage takes place within the refrigerant fluid. In this context, as well, the constructional expenditure is not negligible due to the required second heat exchanger and a pump for pumping the ice-water mixture. Moreover, energy efficiency is reduced by the multiple heat transitions and the use of the pump. On the one hand, the pump needs electric drive power and, on the other, the heat input into the refrigerant fluid increases the required cooling capacity and consequently the power consumption of the refrigerant compressor.

U.S. Pat. No. 7,134,483 B2 proposes a latent heat storage material to be provided in a plate, with the plate contacting both a refrigerant plate and an air plate. In constructional respect, however, many questions remain unanswered. The U.S. Pat. No. 7,134,483 B2 document does not contain a specific description of how to configure the plates. As a whole, the configuration according to U.S. Pat. No. 7,134,483 B2 also seems to be comparably inefficient.

DE 103 11 602 A1 proposes a thermal accumulator to be provided in an edge area of a gas-refrigerant area of a heat exchanger. Providing the thermal accumulator at the outer sides of the heat exchanger, however, is comparably space-consuming and results in the heat exchanger operating at low energy efficiency.

SUMMARY

The invention relates to a heat exchanger according to claim 1 for a refrigerant dryer such as a compressed air refrigerant dryer, and a refrigerant dryer according to claim 15 such as a compressed air refrigerant dryer.

BRIEF DESCRIPTION OF THE DRAWINGS

FIG. 5 is an oblique view of a section of the embodiment as per FIG. 4 in;

DETAILED DESCRIPTION

The invention is hence based on the task of providing a heat exchanger for a refrigerant dryer such as a compressed air refrigerant dryer which enables operation at low pressure dew point fluctuations and at the same time has comparably low constructional expenditure (in particular with respect to the occupied space, weight and/or material used). The heat exchanger is furthermore intended to enable a comparably efficient operation.

This task is solved by a heat exchanger according to claim 1 for a refrigerant dryer such as a compressed air refrigerant dryer, as well as a refrigerant dryer according to claim 15 such as a compressed air refrigerant dryer.

This task is in particular solved by a heat exchanger for a refrigerant dryer, preferably a compressed air refrigerant dryer comprising at least one first inflow surface element, past which a fluid to be dried, e.g. compressed air, can flow during operation of the heat exchanger, and comprising at least one second inflow surface element, past which a refrigerant fluid can flow (as required) during operation of the heat exchanger, wherein the first and second inflow surface elements are or can be coupled at least in some areas to at least one cold store chamber provided for filling with a cold accumulator medium, and wherein the first and/or second inflow surface element(s) are (is) connected to at least one heat transfer element which extends into the cold store chamber, e.g. penetrates the cold store chamber.

An essential idea of the invention is providing heat transfer elements extending into the cold store chamber. By providing the cold store chamber for filling with a cold accumulator medium, only comparably low pressure dew point fluctuations are to be expected, wherein the heat transfer elements result in comparably short heat conducting paths so as to enable a comparably rapid filling and discharging of the cold accumulator medium. The constructional expenditure is comparably low in this case. The U.S. Pat. No. 7,134,483 B2 document proposes a stack of profiled metal plates in which the thermal contact from one plate to the next, and hence from one gap to the next but one, is comparably low. In comparison, the thermal contact according to the present invention is increased. In particular as compared to U.S. Pat. No. 7,134,483 B2, a rapid emission of heat is also possible when a latent accumulator material is used such as for instance solidification heat via a refrigerant side and a subsequent rapid absorption of heat such as for instance melting heat from an opposite air side. In particular, latent accumulator materials such as paraffins exhibit comparably poor heat conducting values so that the refrigerant dryer according to the invention is particularly advantageous here. The problems resulting from the exterior mounting of the thermal accumulator in the case of the DE 102 11 602 A1 document, for example, are also reduced by the inventive refrigerant dryer proposed herein.

As compared to DE 103 11 602 A1, the transfer surfaces are comparably large and the heat conducting paths comparably short which leads to an efficient operation of the refrigerant dryer as a whole.

The term "coupling" refers to an in particular direct boundary, or contacting respectively, of the cold store chamber by the first respectively second inflow surface element. It is yet also conceivable to provide a further heat transfer element or a further heat transfer device between the inflow surface element and the cold store chamber.

The heat transfer from (respectively to) the cold accumulator medium ensues in particular via the heat transfer element. A plurality of heat transfer elements can be involved. A heat transfer can take place, for example, from the cold accumulator medium to the air to be dried via the heat transfer element, a first plate, a refrigerant agent-heat transfer element, a second plate, and an air-heat transfer element.

The refrigerant agent can flow within the refrigerant agent-heat transfer element. The refrigerant agent-heat transfer element can be realized like the heat transfer element. The same applies to the air-heat transfer element. Here and in the following, the term "heat transfer element" (without any further additions) always means the heat transfer element which extends into the cold store chamber.

The refrigerant agent-heat transfer element and the air-heat transfer element are preferably an integral part of the corresponding inflow element. The refrigerant agent-heat transfer element and the air-heat transfer element further improve the thermotechnical coupling.

The cold store chamber can preferably be filled with a corresponding cold accumulator medium, e.g. a latent heat accumulator medium (PCM, "phase change material"). Heat conductivity of the heat transfer element is preferably at least 10 times, further preferentially at least 30 times, still further preferentially at least 100 times as high as a heat conductivity of the cold accumulator medium. The heat conductivity of the heat transfer element can be, for example, at least 50 W/(mK), preferably at least 100 W/(mK), further preferentially at least 130 W/(mK). A specific heat capacity of the cold accumulator medium can be, for example, at least 1 kJ/(kgK), preferably at least 1.5 kJ/(kgK), still further preferentially at least 2 kJ/(kgK). The phase change enthalpy of the cold accumulator medium can be, for example, at least 50 kJ/kg, preferably at least 100 kJ/kg, further preferentially at least 150 kJ/kg. Water and/or paraffin and/or a liquid crystalline latent heat accumulator and/or a salt or paraffin-based latent heat storage material can preferably be employed as the latent heat accumulator medium. As a whole, the heat absorption capacity (when a latent heat accumulator is used within the range of the phase change temperature) of the cold accumulator medium is in particular comparably high compared to the heat transfer element. In addition, the heat conductivity of the heat transfer element as compared to the cold accumulator medium is in particular comparably high.

As a whole, comparably low filling and discharging times (respectively "loading and discharging times") of the cold store chamber as well as a comparably high storage capacity can be achieved.

The cold store chamber is preferably delimited by a first and/or second, for example flat plate(s) at least in some areas. The first and/or second inflow surface element(s) can be formed at least partially by the first or second, e.g. flat plate. Conversely, the first and/or second, e.g. flat plate(s) can be formed at least partially by the first or second inflow surface element. The filling respectively discharging can be further improved by such plates which increases the efficiency of the heat exchanger.

The first and/or second inflow surface element(s) can at least partially be formed by a duct wall section, e.g. a tube wall section. A tube section preferably can be rectangular, e.g. square, or have a circular cross-section. Such a structural shape reduces the constructional expenditure, in particular the space requirement.

In a specific embodiment, the heat transfer element is soldered to the first and/or second inflow surface element(s), respectively the first and/or second, e.g. flat plate(s). The heat transfer and thus the efficiency of the heat exchanger are thus improved.

Preferably, any point within the cold store chamber is closer to a next heat transfer element than a maximum distance, with the maximum distance being smaller than a plate distance between the plates, wherein a ratio of plate distance to maximum distance is preferably at least 4, further preferentially at least 6, still further preferentially at least 10. The maximum distance can preferably be from 0.5 mm to 2.00 mm, e.g. about 0.75 mm to 1.25 mm. The cold store chamber and the at least one heat transfer element are thus preferably configured such that no point within the cold store chamber is further distant than a predetermined maximum distance. This allows comparably short heat conducting paths to be achieved within the cold store chamber, respectively within the cold accumulator medium, so that even in case of comparably low heat conducting capacity to the cold accumulator medium, large amounts of heat can be absorbed respectively dissipated within short time. This allows a comparably high efficiency to be reached at low space requirement.

The maximum distance is the largest distance given between one point within the cold accumulator medium to the respective next heat transfer element.

In a preferred embodiment, at least one heat transfer element exhibits at least two sections, e.g. extending in parallel, spaced from each other by a heat transfer distance, wherein the sections extend preferably (essentially) perpendicular to at least one of the e.g. flat plates, wherein the heat transfer distance is preferably smaller than a plate distance of the plates, wherein a ratio of the plate distance to the heat transfer distance further preferentially is at least 2, still further preferentially at least 3, still further preferentially at least 5, still further preferentially at least 10. This allows the efficiency of the heat exchanger to be improved in a structurally simple manner.

The plate distance can preferably be at least 5 mm, further preferentially at least 10 mm. The heat transfer distance can preferably be 1 mm to 4 mm, e.g. 1.5 mm to 2.5 mm.

Preferably, a connecting surface, e.g. a solder connection surface, between the first and/or second inflow surface element(s) and/or the first and/or second, e.g. flat plate(s) on the one hand and the at least one heat transfer element on the other constitutes at least 10%, preferably at least 20%, further preferentially at least 30%, still further preferentially at least 50% of a surface oriented in the direction of the cold store chamber of the first/second inflow surface element, respectively the first/second, e.g. flat plate. This allows improving the efficiency together with the heat transfer. The connection can (in general) even be made by welding or bonding.

The heat exchanger, e.g. at least one inflow surface element and/or at least one (flat) plate and/or at least one heat transfer element is/are preferably at least partially made of metal, e.g. aluminum. This, too, allows improved efficiency.

A gas-gas area within the heat exchanger is preferably configured such that a heat exchange can occur between fluid to be dried and dried fluid. This allows the efficiency of the heat exchanger to be enhanced.

Further preferentially, a guiding means for the gas to be dried is at least partially defined by at least one, e.g. at least two of the especially flat plates, wherein the guiding means extends still further preferentially at least partially through the gas-gas area and a gas-refrigerant agent area for exchanging heat between the fluid to be dried and the refrigerant agent. This reduces the constructional expenditure and particularly achieves a low pressure loss on the side of the fluid to be dried.

In a preferred embodiment, a tube bent in a meander shape is provided for guiding the refrigerant agent, with the tube being preferably soldered between the two (flat) plates, and further preferentially at least one cold store chamber being provided between each of two tube passages. A space-saving construction is thus enabled.

In a preferred embodiment, at least one refrigerant agent guiding means is realized as a space between at least two (flat) plates, with the plates being preferably soldered (generally fixedly connected) to at least one heat transfer element. The expenditure in the constructional respect is thus low.

A separating plate preferably extends between the refrigerant agent and accumulator medium at least in some areas also across the gas-gas area. Thus, component tolerances are made uniform and an impervious soldering is enabled.

At least two cold store chambers are preferably fluidically interconnected by at least one, e.g. welded collecting device which is mounted to an external side as need be. Thus, filling is made easy and in particular possible via only one filling point.

The above task is moreover solved by a refrigerant dryer, e.g. compressed air refrigerant dryer, comprising a heat exchanger according to the above described type. Reference is made to the already described heat exchanger with respect to the advantages.

Further embodiments will result from the dependent claims.

In the following, the invention will also be defined with respect to further features and advantages by means of exemplary embodiments which will be explained in greater detail on the basis of the Figures.

Figure 1:
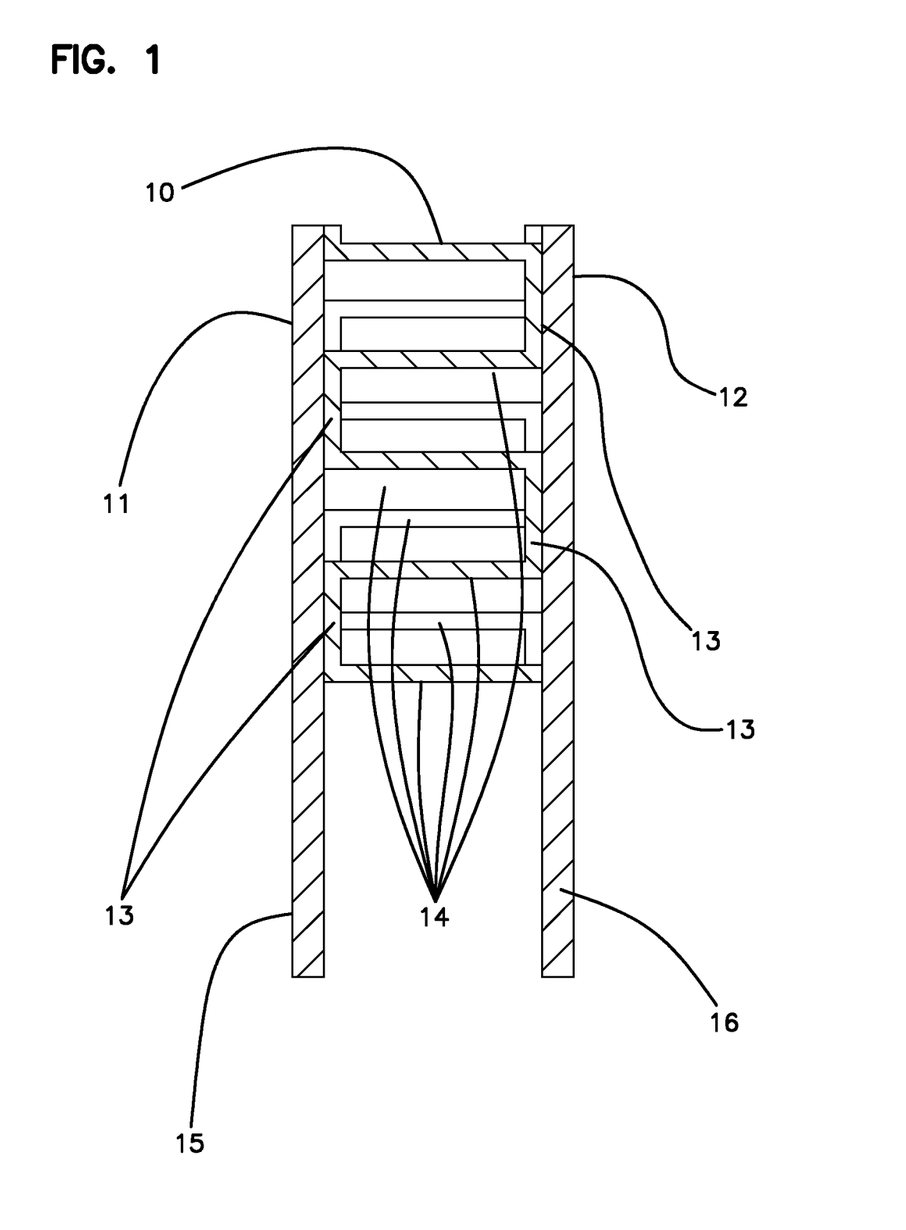
FIG. 1 is a schematic sectional view of a heat transfer element of the invention.

FIG. 1 shows a heat transfer element 10 which is soldered in between a first flat plate 11 and a second flat plate 12. The heat transfer element 10 consists in this case of a sheet metal which is intermittently bent by respective 90 degrees. The sheet metal is preferably provided with slots. Bending points may be offset in some areas by a predefined amount. The heat transfer element 10 comprises connecting sections 13 extending preferably in parallel to the flat plates 11, 12, and transfer sections 14 standing preferably vertically on the connecting sections 13 or flat plates 11, 12 respectively. The sheet metal-type heat transfer element 10 extends as a whole (essentially) in parallel to the delimiting flat plates 11, 12 (with the partial sections also extending in parallel to the flat plates). Distances between each two transfer sections 14 extending approximately parallel are in this case selected to be comparably narrow so that short heat conducting paths result in a cold accumulator medium which can be introduced between the flat plates 11, 12. The parallel extension of the transfer sections 14 enables a good heat transport via the connecting sections 13 to the flat plates 11, 12. This kind of a heat transfer element can in principle also be provided within a gas-gas area, respectively all the plate gaps through which a fluid flows.

The connecting sections 13 of the heat transfer element 10 are soldered to the flat plates 11, 12 but can also be glued or fixedly connected to same in another manner.

A refrigerant fluid (generally refrigerant agent) can for example flow past an external side 15 of the first flat plate 11. The gas to be dried can for example flow past an external side 16 of the second flat plate 12. In such a configuration, the second flat plate 12 serves as a first inflow surface element past which a fluid to be dried, in particular compressed air, can flow during the operation of the heat exchanger. The first flat plate 11 serves in such a configuration as a second inflow surface element past which the refrigerant agent can flow as needed during the operation of the heat exchanger.

Figure 2:
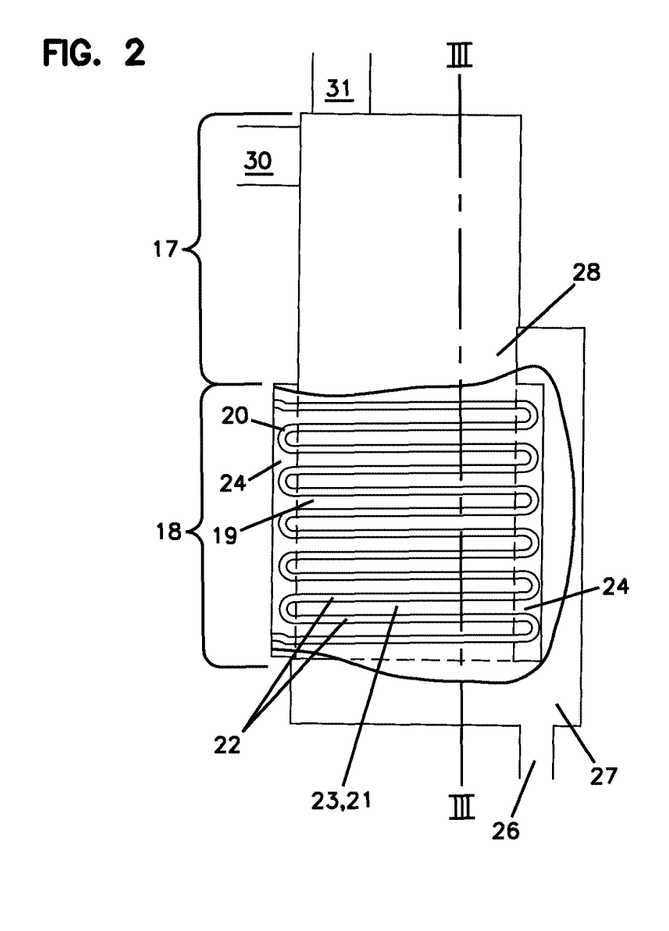
FIG. 2 is a schematic side view of one embodiment of a heat exchanger according to the invention.
Figure 3:
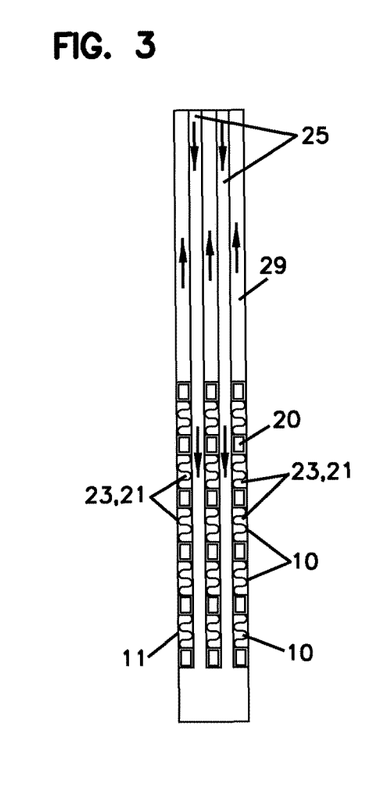
FIG. 3 is a sectional view of the embodiment shown in FIG. 2, taken along section line III-III.

A first embodiment of the heat exchanger can be seen in FIG. 2 in a schematic side view and in FIG. 3, which is a sectional view of the embodiment shown in FIG. 2, taken along section line III-III. The heat exchanger is subdivided into a first (upper) area, namely a gas-gas area 17, and a second (lower) area, namely a gas-refrigerant agent area 18. A heat exchange between the gas to be dried and an at least partially dried gas can take place in the gas-gas area 17. In the gas-refrigerant agent area, a heat exchange between the gas to be dried and the refrigerant agent can take place via a plate between a refrigerant agent tube 20 and a first passage 25 for the gas to be dried. The refrigerant agent tube 20 bent in a meander shape which exhibits a rectangular (preferably square) cross-section is located within the gas-refrigerant agent area 18. Alternatively, the refrigerant agent tube 20 can also have a circular or even another different cross-section. Cold accumulator subspaces 23 for receiving the cold accumulator medium are located in gaps 21 between the opposite, parallel extending longitudinal sections 22 of the refrigerant agent tube 20. The cold accumulator subspaces 23 are interconnected via a collecting device 24 (collector box) at an external side of the heat exchanger and constitute the cold store chamber 19. Heat transfer elements 10 enabling a comparably rapid filling or discharging of the cold accumulator subspaces 23 are respectively provided within the cold accumulator subspaces 23.

The collecting device 24 extends preferably across two opposite external sides of the heat exchanger. Alternatively, two collecting devices 24 of mutually complementary configuration can be provided at the external sides.

During operation, the gas to be dried first flows through the gas-gas area 17 through the first passages 25 and then through the gas-refrigerant agent area 18. In the gas-refrigerant agent area 18, the gas to be dried flows past both the meander-shaped refrigerant agent tube 20 and the cold accumulator partial spaces 23. After flowing through the gas-refrigerant agent area 18, the gas to be dried flows through a deflecting area in which a precipitating condensate can be separated and discharged through a condensate drain 26. The gas to be dried continues to flow from the deflecting area 27 via an inlet 28 through second passages 29 in the gas-gas area 17 (in a counter-flow to the inflowing gas) to an outlet 30. The gas to be dried can be supplied via a feed line 31.

The heat exchanger as per FIGS. 2 and 3 as a whole is of a sandwiched construction, wherein one of the second passages 29 extends in a first, third and fifth layer between each of two plates within the gas-gas area 17, and in each case one of the meander-shaped refrigerant agent tubes 20 is provided within the gas-refrigerant agent area 18 with cold accumulator subspaces 23 being arranged between the longitudinal sections 22 of the refrigerant agent tube 20. One of the first passages 25 for the inflowing gas to be dried extends in each of a second and fourth layer. The arrangement can basically be of any other configuration, for instance at least three layers of first passages and at least two layers of second passages can be provided. In general, an alternating arrangement of first and second passages is preferred.

Figure 4:
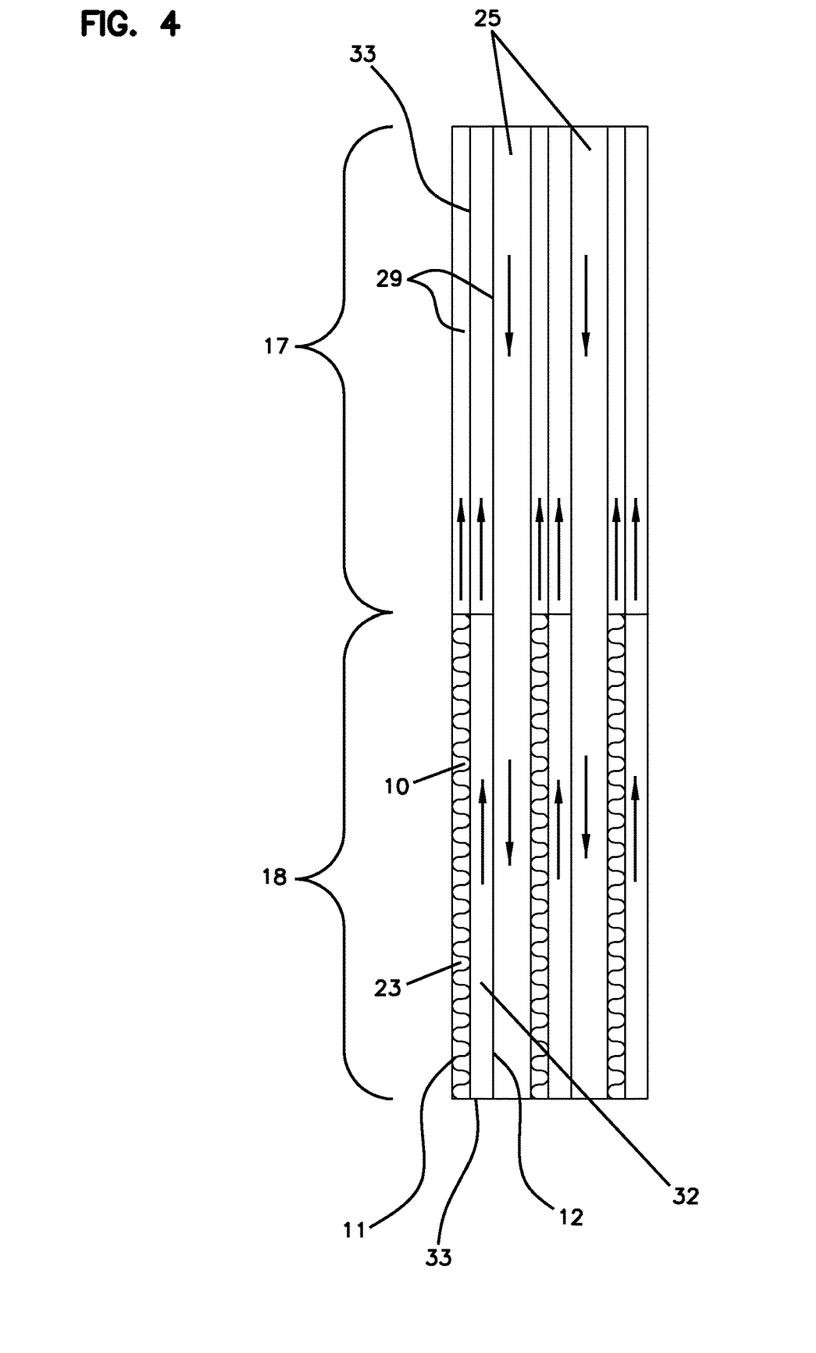
FIG. 4 is a schematic side view of another embodiment of a heat exchanger according to the invention.

FIG. 4 shows a second embodiment of the heat exchanger in a schematic sectional view. The heat exchanger as per FIG. 4 is likewise divided into a gas-gas area 17 and a gas-refrigerant agent area 18. During operation, the gas first flows via a feed line which is not illustrated through the gas-gas area 17 through first passages 25 and subsequently the gas-refrigerant agent area 18.

Refrigerant agent lines 32 and cold accumulator subspaces 23 for a cold accumulator medium are provided between each of two flat plates 11, 12 in the gas-refrigerant agent area 18. The cold accumulator subspaces 23 are separated from the refrigerant agent lines 32 by (flat) separating plates 33. The flat plates 11, 12 as well as the separating plate 33 extend (essentially) parallel to the first passages 25. Heat transfer elements 10 are provided in the cold accumulator subspaces 23. Further heat transfer elements may also be situated in the first passages 25 and/or refrigerant agent lines 32 and/or second passages 29. The shape and dimension of the respective heat transfer elements may differ from one another. The separating plate 33 extends both through the gas-refrigerant agent area 18 and the gas-gas area 17. Thus, two adjacent second passages 29 of mutually parallel extension for the exiting, partially dried gas respectively result in the gas-gas area 17. Analogously to FIGS. 2 and 3, a deflecting and separating chamber having a condensate drain can be provided (not to be seen in FIG. 4).

The heat exchanger as per FIG. 4 is also of a five layer construction, wherein first passages 25 respectively extend in a second and fourth layer. Two second passages 29 extend in each first, third and fifth layer within the gas-gas area 17 and a cold accumulator subspace 23 as well as a refrigerant agent line 32 extending in the gas-refrigerant agent area 18. Yet more or fewer than five layers, e.g. only three layers, can also be provided in analogy to the configuration shown in the figures (same applies also to the embodiments as per FIGS. 2 and 3).

Media of different kinds can be used as the accumulator medium. When latent heat accumulator media are used, a phase change temperature is preferably in a predefined operational range for the heat exchanger. As accumulator media, materials for instance such as paraffins, carboxylic acids, fatty alcohols, esters, amines and/or halogenated hydrocarbons, as well as mixtures of such substances or else inorganic materials such as salt hydrates can be employed. Materials having a transition range (essentially) slightly above the freezing point of water are particularly suited for drying compressed air, hence, for example, between 0° and 5° Celsius, preferably in the range of from 1.5° to 2.5° Celsius.

The offset arrangement of the bending points which can be recognized in FIG. 1 facilitates the filling in of an accumulator medium in a structurally simple manner, respectively improves the heat transition when the gas to be dried or the refrigerant agent flows through.

Figure 5:
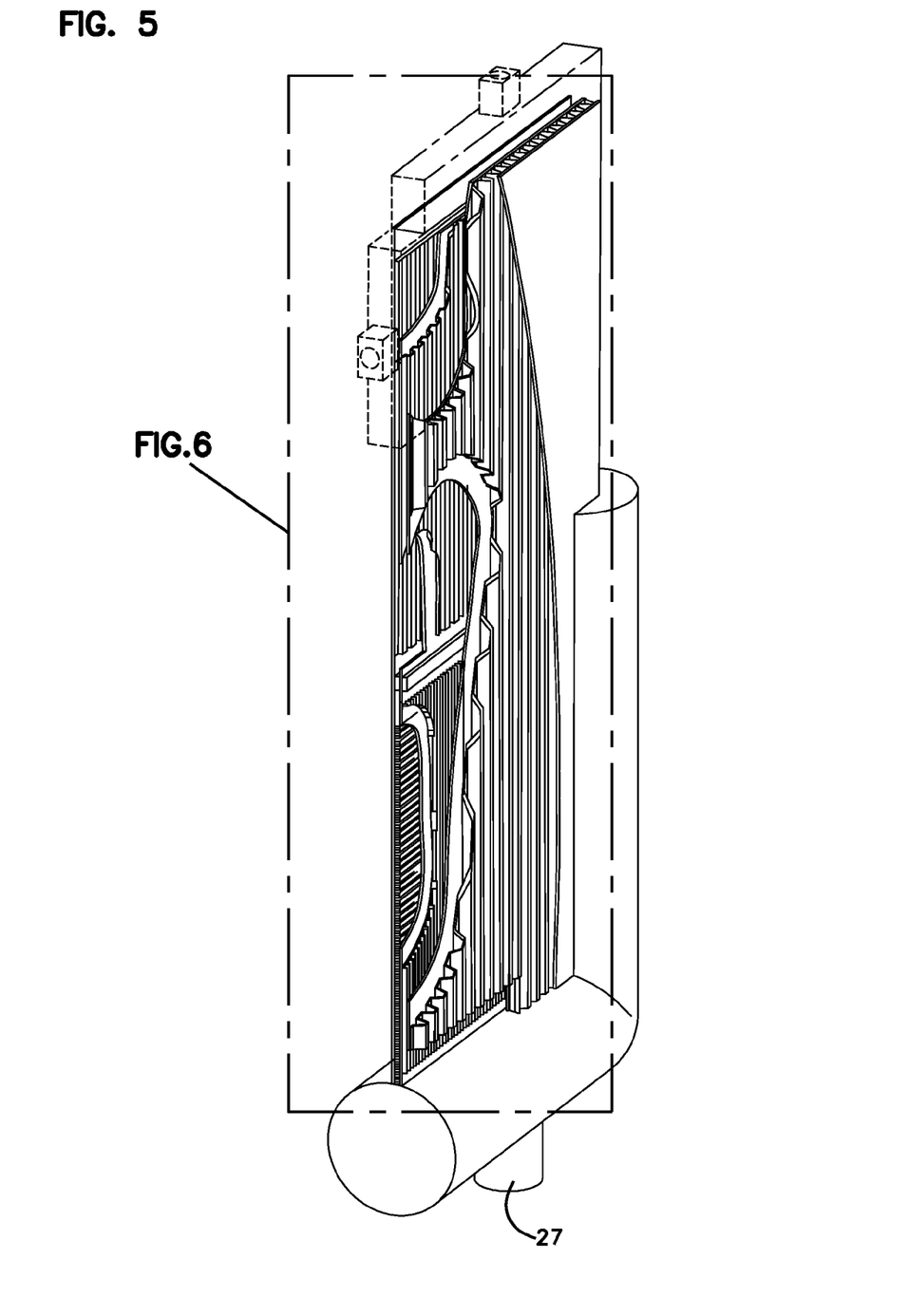

FIG. 5 shows a section of the embodiment as per FIG. 4 in an oblique view. The configuration as per FIGS. 5 and 6, however, can also be regarded as being a complete heat exchanger. Analogously to FIG. 4, two second passages 29 separated from each other by the separating plate 33 are provided between the first and second flat plates 11, 12 in the gas-gas area 17. Each second passage 29 is isolated, respectively sealed, against the gas-refrigerant agent area 18 by a separating bar 34. Intermittently bent sheet metals 35 are arranged in the second passages 29, along which the partially dried fluid can flow. The sheet metals 35 are bent so as to form approximately trapezoidal recesses in cross-section.

Figure 6:
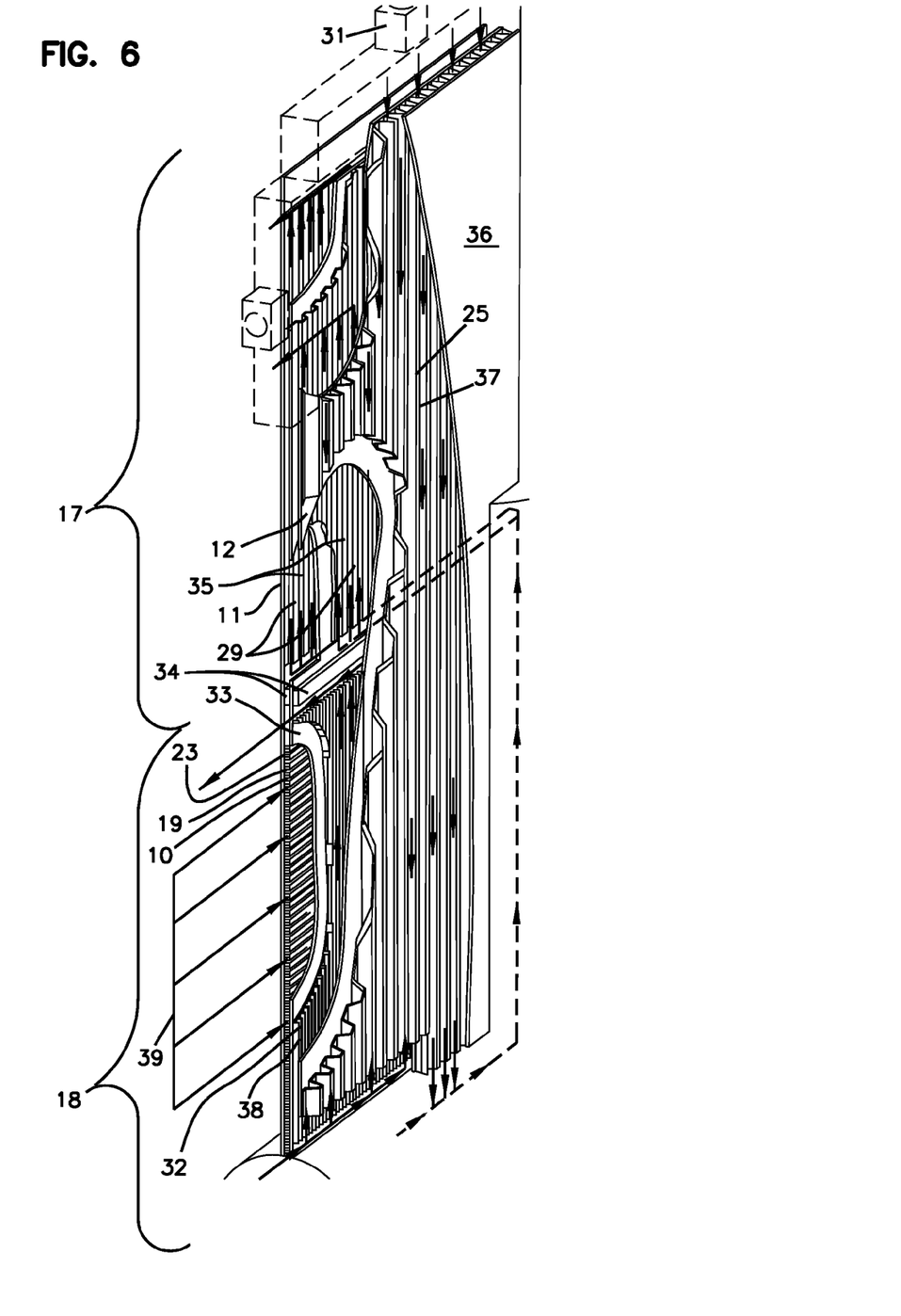
FIG. 6 is an enlarged sectional view of the embodiment shown in FIG. 5.

The first passage 25, in which the fluid to be dried passes, is situated between the flat plate 12 and a flat plate 36. An intermittently bent sheet metal identified by reference numeral 37 is also situated in the first passage 25. The sheet metal 37 exhibits intermittently repeating recesses of approximately trapezoidal configuration in cross-section.

The refrigerant agent line 32 which comprises a fin plate 38 is situated between the separating plate 33 and the second flat plate 12 in the gas-refrigerant agent area 18. The fin plate 38 exhibits intermittently repeating fins so that a plurality of individual fluid ducts is formed for the refrigerant agent. Analogously, the sheet metal 35 and the sheet metal 37 also form a plurality of fluid ducts. The fluid ducts of the sheet metal 35, sheet metal 37 and rib plate 38 extend from the top to the bottom, respectively independently of the orientation of the feed line 31 to the condensate drain 27, in FIGS. 5 and 6. A cold store chamber 19, respectively a plurality of cold accumulator subspaces 23, are provided in the gas-refrigerant agent area 18 between the first flat plate 11 and the separating plate 33. The cold store chamber 19 comprises a heat transfer element 10 formed as an intermittently bent sheet metal. A cold accumulator medium is introduced into the cold store chamber 19, respectively the recesses of the sheet metal-like heat transfer element 10. The cold accumulator medium is provided to be preferably stationary within the cold store chamber 19 (same also applies to the other embodiments), and can further preferentially be introduced via a filling device 39 which preferably corresponds to the collecting device 24. A plurality of fluid ducts extending horizontally or vertically to the fluid ducts of the sheet metals 39 and the fin plate 38 are provided in the heat transfer element 10. The heat transfer is thereby improved in a simple manner which improves efficiency.

Preferably after the arranging of several, in particular all components (plates, heat transfer elements, bars and/or conduits as needed), the heat exchanger can be soldered in a continuous furnace under inert gas atmosphere or in a vacuum furnace or else in a flux bath. The heat transfer elements can for instance be inserted into so-called aluminum block heat exchangers so as to achieve comparably high heat transfer capacity during flow. The heat transfer elements are in particular suited for use with a stationary accumulator medium. The heat transfer elements may for example be folded thin sheet metals containing slots, holes and/or other recesses as need be.

The foldings in particular in slotted sheet metals can also be realized to be offset in some sections.

The heat transfer elements can also be alternatively realized as extruded or continuously cast profiles. The proposed heat exchanger (accumulator heat exchanger) provides a comparably large surface in solder-connection with the delimiting plates on the one hand and a large contact surface with the accumulator medium having in particular narrow distances from heat conducting sections on the other. Preferably, the structure can be filled throughout with an accumulator medium.

Both short filling times (discharging times) as well as a comparably high storage capacity are thereby achieved. The short heat conducting paths in the accumulator medium (latent accumulator medium) are enabled by a corresponding design to the heat transfer element. This allows large amounts of heat to be absorbed respectively output within short time despite the usually comparably low heat conductivity of the accumulator medium.

The heat transfer elements exhibit preferably narrow recesses (e.g. of a width of from 1.5 mm to 2.5 mm) which further preferentially extend (essentially) perpendicular or at an angle of >60 degrees to the flat plates so that from any arbitrary point within the accumulator medium, a comparably short heat conducting path to the heat transfer element—at least in parallel to the plates—is realized. Due to the comparably high heat conductivity of the heat transfer elements, the spacings of the separating plates can be realized to be clearly larger than the width of the heat transfer elements' recesses (e.g. 8 mm to 12 mm, particularly 10 mm) so that a comparably large volume is achieved for the accumulator medium. By manufacturing the heat transfer elements from a material having high heat conductivity such as aluminum and/or areally soldering the heat transfer elements to the flat plates, a rapid heat transport both from the refrigerant agent to the accumulator medium and from the accumulator medium to the gas to be dried can be achieved at low temperature differences.

In the embodiment as per FIG. 2, a comparably good heat-conducting connection from the cold accumulator medium to the respective plate and thus both to the first passages 25 on a facing plate side and to the refrigerating agent tube 20 is achieved. The refrigerant agent tube 20 is preferably soldered to at least one of the plates. As a whole, a compact, lightweight, cost-efficient heat exchanger construction requiring little tubing is provided, with an energy-efficient operation by means of a (simple) ON/OFF control at concurrently low pressure dew point fluctuations being enabled at the same time. A high storage density can be achieved in particular with latent accumulator materials, which results in sufficient storage capacity with the proposed large transfer surface even at a comparably small accumulator volume. When the cold accumulator medium is introduced into the gaps between the meander-shaped refrigerant agent tube 20, the additional expenditure for integrating the cold accumulator medium is then comparably low so as to enable, in comparison to accumulator refrigerant dryers according to the prior art, a clearly smaller, lighter and more cost-efficient refrigerant dryer with the same function.

The heat exchanger is preferably realized as a combined heat exchanger with a gas-gas area and a gas-refrigerant agent area (gas-refrigerant agent-accumulator area), further preferentially with an incoming gas passage passing through both heat exchanger areas. Alternatively, however, it is also possible to realize one accumulator area in a separate gas-refrigerant agent heat exchanger (gas-refrigerant agent-accumulator heat exchanger).

In the embodiment as per FIGS. 4 to 6, the separating plate extends between the cold accumulator medium and the refrigerant agent over the entire height (longitudinal extension) of the heat exchanger so that the passages for the exiting, at least partially dried gas are each divided into two adjacent parallel passages.

This configuration provides for realizing low tolerances, which are necessary for an impervious soldering, in a constructively simple manner. This allows a comparably compact combined heat exchanger to be realized.

Figure 7:
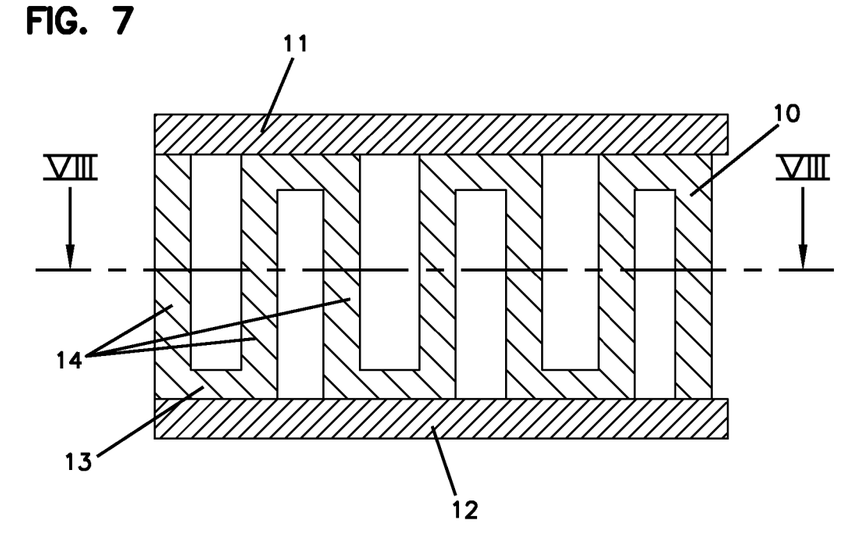
FIG. 7 is a schematic view of a heat transfer element arrangement of the invention.
Figure 8:
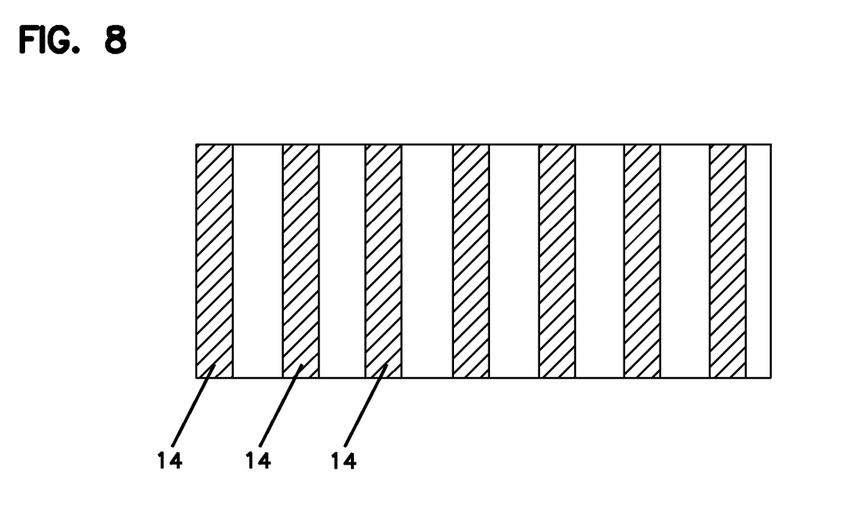
FIG. 8 is a sectional view of the embodiment shown in FIG. 7 taken along section line VIII-VIII.

FIG. 7 shows a further schematic sectional view of the heat transfer element arranged between two plates. A sum of the cross-sectional areas of the transfer sections 14 amounts preferably to at least 5%, further preferentially at least 10%, still further preferentially (about) 15% of a plate surface (which is further explained by FIG. 8).

Figure 9:
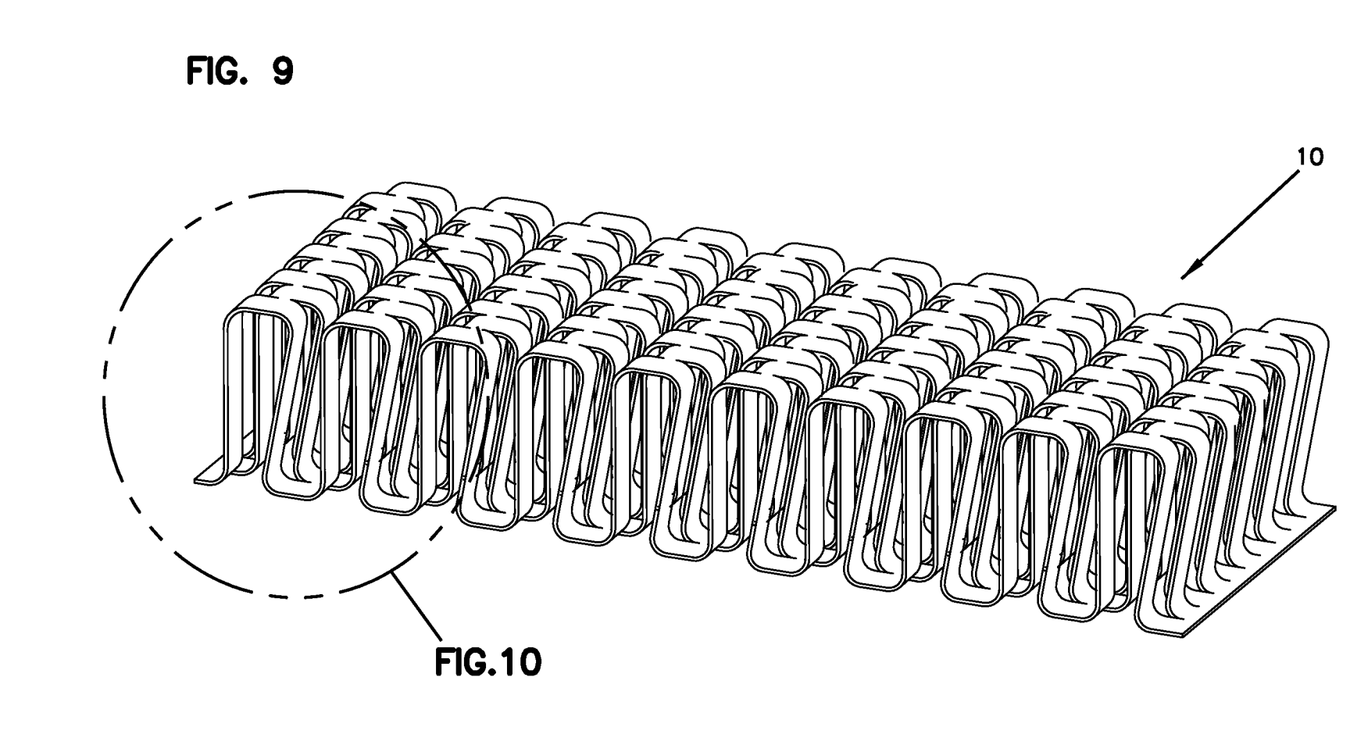
FIG. 9 is an oblique view of a heat transfer element of the invention.
Figure 10:
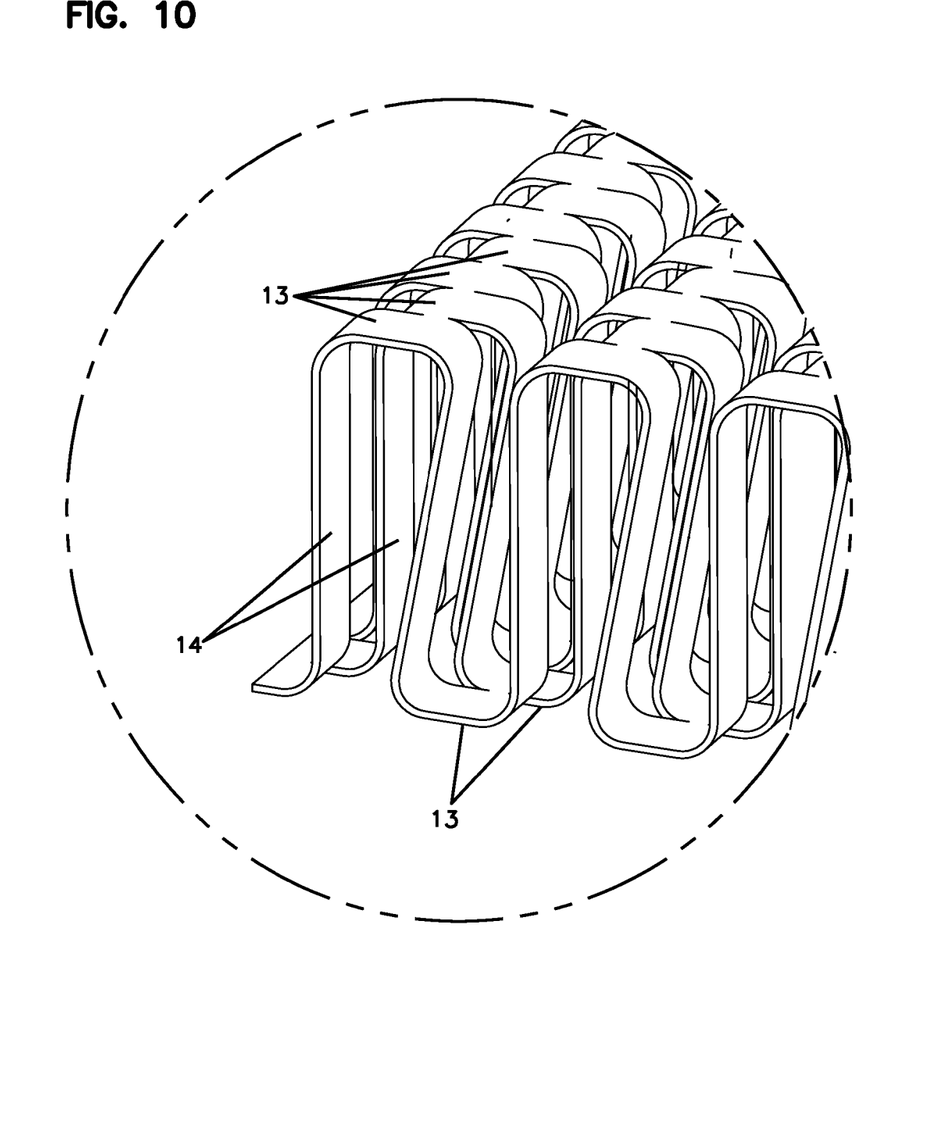
FIG. 10 is an enlarged view of section J from FIG. 9.

FIG. 9 shows the heat transfer element 10 in an oblique view. The heat transfer element 10 is made integrally from one sheet metal by forming slots and bending the sheet metal. The heat transfer element 10 comprises several heat transfer element rows 40, each corresponding to an intermittently bent sheet metal strip. Two adjacent heat transfer element rows 40 are each of identical configuration, yet offset in a direction parallel to the preferential direction of the heat transfer element rows by a predetermined amount. The predetermined amount can be for example (approximately) a quarter period of the intermittent bendings. In total, a heat transfer element 10 is thereby created which is comparably stable on the one hand and enables a comparably simple filling with a cold accumulator medium on the other.

Aluminum or aluminum alloys, e.g. $AlMg_3$ may in particular be employed as the materials for the heat transfer elements and/or plates and/or refrigerant agents. The materials preferably exhibit a heat conductivity of more than 100 $W/(m^2K)$, further preferentially of more than 130 $W/(m^2K)$, and thus lie clearly above the heat conductivities of usual latent accumulator materials in which the thermal conductivity value is below at least 2 $W/(m^2K)$ or even 1 $W/(m^2K)$.

In the embodiment according to FIGS. 4 to 8 having parallel ducts for the refrigerant agent, the cold accumulator medium (PCM) and the gas to be dried, a wall is provided on each side of the corresponding duct which can be a separating wall to a respective other duct. Edge ducts have no common separating wall to another duct. Due to the high heat conductivity of the heat transfer elements 10, a high heat transport can still take place even between adjacent ducts. The good heat transport is in addition also achieved by the comparably large cross-sectional area as per FIG. 8.

In order to feed a large amount of heat within short time to the cold accumulator medium (latent accumulator material) at low temperature differences, respectively dissipate it from the medium and thereby utilize the storage volume as efficiently as possible, a comparably large specific surface of the heat transfer elements 10 relative the storage volume of the cold store chamber 19 is preferably provided, with the specific surface being further preferentially at least 500 $m^2/m^3$, still further preferentially at least 1000 $m^2/m^3$, still further preferentially (about) 1200 $m^2/m^3$.

It is to be noted at this point that all of the above described components, whether alone or in any combination, are claimed as being essential to the invention, in particular the details depicted in the drawings. Variations thereof will be familiar to those skilled in the art.

LIST OF REFERENCE NUMERALS 10 heat transfer element
11 first flat plate
12 second flat plate
13 connecting section
14 transfer section
15 external side of first flat plate
16 external side of second flat plate
17 gas-gas area
18 gas-refrigerant agent area
19 cold store chamber
20 refrigerant agent tube
21 gap
22 longitudinal section
23 cold accumulator subspace
24 collecting device
25 first passage
26 deflecting area
27 condensate drain
28 inlet
29 second passage
30 outlet
31 feed line
32 refrigerant agent line
33 separating plate
34 separating bar
35 sheet metal
36 flat plate
37 sheet metal
38 fin plate
39 filling device
40 heat transfer element row

The invention claimed is:

1. A heat exchanger for a refrigerant dryer, the heat exchanger comprising at least one first inflow surface element, past which a fluid to be dried is guided during operation of the heat exchanger, and at least one second inflow surface element, past which a refrigerant agent is guided during operation of the heat exchanger,
   wherein the first and second inflow surface elements are situated to be coupled to at least one cold store chamber provided for filling with a cold accumulator medium, and
   wherein at least one of the first and second inflow surface elements is connected to at least one heat transfer element which extends into and penetrates the cold store chamber.

2. The heat exchanger according to claim 1, wherein the cold store chamber is delimited at least in some areas by at least one of a first flat plate and a second flat plate.

3. The heat exchanger according to claim 2, wherein at least one of the first and second inflow surface elements is formed at least partially by one of the first and second flat plates; or wherein at least one of the first and second flat plates is formed at least partially by one of the first and second inflow surface elements.

4. The heat exchanger according to claim 2, wherein the at least one heat transfer element is soldered to at least one of the first and second inflow surface elements, and respectively to at least one of the first and second flat plates.

5. The heat exchanger according to claim 2, wherein a distance of any point within the cold store chamber to a next one of the at least one heat transfer element is closer than a plate distance between the first and second flat plates.

6. The heat exchanger according to claim 2, wherein the at least one heat transfer element comprises at least two sections extending in parallel and spaced from each other by a heat transfer distance, wherein the at least two sections extend essentially perpendicular to at least one of the first and second flat plates, wherein the heat transfer distance is less than a mean plate distance between the first and second flat plates, and wherein a ratio of the mean plate distance to the heat transfer distance is at least two.

7. The heat exchanger according to claim 6, wherein the ratio of the mean plate distance to the heat transfer distance is at least 4.

8. The heat exchanger according to claim 6, wherein the ratio of the mean plate distance to the heat transfer distance is at least 3.

9. The heat exchanger according claim 2, further comprising a connection surface between at least one of the first inflow surface element, the second inflow surface element, the first flat plate, and the second flat plate and the at least one heat transfer element, the connection surface constituting at least 10% of a surface oriented in a direction of the cold store chamber of the first and second inflow surface elements, respectively the first and second flat plates.

10. The heat exchanger according to claim 9, wherein the connection surface constitutes at least 20% of the surface oriented in the direction of the cold store chamber of the first and second inflow surface elements.

11. The heat exchanger of claim 9, wherein the connection surface is formed as a solder connection surface.

12. The heat exchanger according to claim 2, further comprising a gas-gas area configured to allow heat exchange between a fluid to be dried and an at least partially dried fluid.

13. The heat exchanger according to claim 12, wherein at least one of the first and second flat plates extends at least partially through the gas-gas area and a gas refrigerant agent area for exchanging heat between the fluid to be dried and the refrigerant agent and is in contact with the fluid to be dried.

14. The heat exchanger according to claim 12, further comprising a separating plate extending between the refrigerant agent and the accumulator medium and at least in some sections also across the gas-gas area.

15. The heat exchanger according to claim 2, further comprising a refrigerant agent tube bent in a meander shape and soldered between the first and second flat plates, and wherein the at least one cold store chamber comprises a cold accumulator subspace disposed between each bend in the tube.

16. The heat exchanger according to claim 2, further comprising at least one refrigerant agent guiding means disposed between at least the first and second flat plates, wherein the first and second flat plates are soldered to the at least one heat transfer element.

17. The heat exchanger according to claim 1, further comprising at least two cold store chambers disposed in fluid connection with at least one collecting device, wherein the at least one collecting device is attached to an external portion of the heat exchanger.

18. The heat exchanger according to claim 1, wherein at least one of the first and second inflow surface elements is formed at least partially by a duct wall section.

19. The heat exchanger according to claim 18, wherein the duct wall section is a tubular section.

20. The heat exchanger according to claim 1, wherein the fluid to be dried is compressed air.

21. The heat exchanger of claim 1, wherein the fluid to be dried is a compressed gaseous fluid.

22. A refrigerant dryer comprising a heat exchanger according to claim 1.

* * * * *